United States Patent
Richerzhagen

[19]
[11] Patent Number: 5,902,499
[45] Date of Patent: May 11, 1999

[54] METHOD AND APPARATUS FOR MACHINING MATERIAL WITH A LIQUID-GUIDED LASER BEAM

[76] Inventor: Bernold Richerzhagen, 15b, chemin de l'Ochettaz, CH-1025 Saint-Sulpice, Switzerland

[21] Appl. No.: 08/750,130
[22] PCT Filed: May 22, 1995
[86] PCT No.: PCT/IB95/00390
  § 371 Date: Feb. 28, 1997
  § 102(e) Date: Feb. 28, 1997
[87] PCT Pub. No.: WO95/32834
  PCT Pub. Date: Dec. 7, 1995

[30] Foreign Application Priority Data

May 30, 1994 [DE] Germany ............... 44 18 845

[51] Int. Cl.$^6$ ............ B23K 26/14; B23K 26/00
[52] U.S. Cl. ............... 219/121.84; 219/121.67; 219/121.72; 83/53; 83/177
[58] Field of Search ............ 219/121.6, 121.61, 219/121.67, 121.68, 121.69, 121.72, 121.73, 121.75, 121.84, 121.85; 83/53, 177

[56] References Cited

U.S. PATENT DOCUMENTS

| | | | |
|---|---|---|---|
| 3,503,804 | 3/1970 | Schneider | 219/121.6 |
| 4,952,771 | 8/1990 | Wrobel | 219/121.67 |
| 5,356,081 | 10/1994 | Sellar | 219/121.62 |

FOREIGN PATENT DOCUMENTS

| | | |
|---|---|---|
| 04 50 313 | 10/1991 | European Pat. Off. . |
| 0515983 | 12/1992 | European Pat. Off. . |
| 36 43 284 | 6/1988 | Germany . |
| 56-163090 | 12/1981 | Japan ............... 219/121.84 |
| 63-188489 | 8/1988 | Japan ............... 219/121.94 |
| 1-316200 | 12/1989 | Japan . |
| 61-245992 | 11/1996 | Japan ............... 219/121.84 |
| 90/02628 | 3/1990 | WIPO . |
| 90/14195 | 11/1990 | WIPO . |

*Primary Examiner*—Gregory L. Mills
*Attorney, Agent, or Firm*—Burns, Doane, Swecker & Mathis

[57] ABSTRACT

An arrangement for processing material with a liquid jet comprising a laser for emitting a laser beam. The arrangement includes a processing module having a nozzle duct connected to a liquid supply line for forming a liquid jet. The nozzle duct has an intake opening lying in an intake opening plane. An optical element couples the laser beam into the liquid jet, and the optical element of the laser beam is focused in a focusing point range and into the intake opening plane of the nozzle duct. The liquid supply line for the nozzle duct defines an area formed above the nozzle intake opening having a height dimensioned relative to the cross-sectional area of the intake opening such that the area above the nozzle intake opening does not include a liquid retaining chamber. The absence of the liquid retaining chamber producing a flow speed for the liquid in a focusing cone point range sufficiently high that, for a predetermined low radiation absorption coefficient for the liquid, the formation of a thermal lens in the liquid in the focusing cone point range is suppressed enough so that no portion of the radiation damages walls of the nozzle duct.

17 Claims, 2 Drawing Sheets

METHOD AND APPARATUS FOR MACHINING MATERIAL WITH A LIQUID-GUIDED LASER BEAM

BACKGROUND OF THE INVENTION

1. Field of the Invention

The invention relates to an arrangement and method for processing material with a laser beam that is guided by a liquid jet.

2. Description of the Prior Art

Laser irradiation is used in a variety of ways for the material processing in the industry—cutting, drilling, welding, marking and material stripping. Nearly all types of material, e.g. steel, steel alloys, nonferrous metals, plastics and ceramics can be processed.

For nearly all of these methods, the laser beam is focused with the aid of an optical element, for example a lens, on the material to be processed in order to generate the intensity necessary for the processing operation. Due to this necessary beam focusing, a processing was possible only at the location of the focus point or the area immediately surrounding it.

From reference DE-A 36 43 284, a method for cutting a material with a laser beam is known, for which this beam was coupled with a water jet that was directed toward the material to be cut and was guided within this water jet. The feeding of the beam is by way of a beam guide (fiber), one end of which projected into the water jet that was produced in a nozzle. The diameter of the water jet was greater than that of the beam guide. The known arrangement had the disadvantage that the water jet diameter could never be smaller than that of the beam guide.

However, in order to achieve a high intensity at the processing location, a smallest possible beam diameter is necessary. The smaller the beam diameter, the lower the output of the laser radiation source with which it is possible to work. The smaller the output capacity of the laser, the lower the purchasing price.

Another disadvantage of the arrangement according to DE-A 36 43 284 resulted from the beam guide end that projected into the water jet. A dead water zone formed below the guide end which, among other things, produced interruptions in the flow that increased exponentially over the length of the water jet and finally resulted in a separation of the jet into drops. That is why it was impossible with this arrangement to achieve a laminar, compact beam length of more than 30 mm.

In the reference EP-A 0 515 983, an attempt was made to eliminate the above disadvantages by designing a water nozzle, which no longer contained the beam guide directly. In front of the nozzle that forms the water jet, there was a water chamber with a water intake and a focusing lens that closed off the chamber to the nozzle intake. This focusing lens is a component of an optical system, with which it was possible to focus the radiation emitted by the beam guide into the nozzle duct of the nozzle. The chamber was designed such that the water inside for the water jet was kept in a quasi standstill condition, that is in a relaxed condition.

However, it has proven that this second design variant of a laser beam to be coupled with a water jet causes uncontrollable damages to the nozzle wall in the area surrounding the nozzle duct intake.

It is the object of the invention to create an arrangement with which a laser beam can be coupled optimally with a fluid jet for material processing, without damage being caused to the nozzle that produces the fluid jet by the laser radiation.

The invention is based on the realization that the laser beam that is focused with the focusing optics into the nozzle range can heat up the liquid more or less strongly, depending on the intensity distribution. Liquid ranges with varied temperatures, a spatial temperature gradient, not only have a spatially specific density distribution, but also a spatial refractive index distribution. Meaning liquids with a spatial temperature gradient react optically as a lens and, as a rule, in the focusing cone of a focused laser beam as a dispersing lens.

An "optimally designed" coupling of the laser radiation with a liquid (water) jet produced in a nozzle duct, as shown in FIG. 2 of the EP-A 0 515 983, unfortunately does not work as assumed. For the arrangement as shown in the EP-A 0 515 983, a thermal lens formed in the range of the focusing cone point, above the nozzle duct intake, which moved the location of the focusing point shown there upwards, as well as increased the focusing diameter considerably. As a result of this, a portion of the laser radiation in the focusing cone hit the nozzle wall, in particular the nozzle surface that faces the liquid retaining chamber used there. As a result of the high intensity which is necessary for the material processing, the wall of the nozzle was consequently damaged.

With the design according to the EP-A 0 515 983, it was of disadvantage that the liquid used was water and the laser radiation was from a ND:YAG with 1.064 $\mu$m. This radiation exhibited especially in water an absorption quality that could not be ignored. The water in the range of the upper pyramid tip of the focused radiation (point range of the focusing cone) was heated according to the intensity distribution (high intensity in the axis and low intensity at the edges) and the above predicted thermal lens developed, which led to damage to the nozzle wall, in particular the nozzle surface in the range of the nozzle intake and in the final analysis led to the destruction of the nozzle that produces the liquid jet.

It was not only the use of water that decreased the degree of effectiveness of the coupling, but also the total structural design of the liquid chamber in front of the nozzle intake. Attempts were made, as is explained on page 7, lines 32 ff and page 9, lines 41 ff, to achieve if possible a standstill in front of the nozzle intake. However, it is this standstill of the liquid that made possible or furthered the formation of the thermal lens. The liquid heated by (even by only a slight) radiation absorption was not removed as fast as possible so that it could not heat up any more, which would have reduced the lens formation effect. On the contrary, this increased heating up caused an even higher refraction for a thermal lens that formed.

However, the invention takes a different route. In this case, everything is done to prevent if possible the formation of a thermal lens or to strongly minimize its effect. The invention uses a liquid with the smallest possible absorption of the laser radiation used, namely silicone oil if the radiation is from the ND-YAG laser.

Furthermore, the structural design of the processing module that includes the nozzle arrangement and the focusing unit is selected such that even for a small radiation absorption that cannot be neglected, the effect of a thermal lens, insofar as it should occur at all, is at a minimum and thus can be neglected.

The invention suggests that the liquid from the range of the focusing cone for the laser radiation, in particular from the area surrounding the point, be removed as fast as possible to keep the heating up time as short as possible. The best results are of course achieved if the liquid remains only for a short time in the focusing cone with a low absorption.

In order to achieve the above conditions, the EP-A 0 515 983 with the liquid retaining chamber used there to hold the liquid at a standstill, which is propagated there, is avoided completely. The level of liquid feeding to the nozzle has approximately the diameter of the nozzle duct or is only slightly larger, simply to reduce the swirling of the flow.

Also, for a preferred design version, no focusing lens is installed in the wall opposite the nozzle intake, as is the case with EP-A 0 515 983, but only a window, which transmits the laser radiation without losses. Only this window, which is located almost directly above the nozzle intake, makes it possible to keep the liquid volume in the point of the focusing cone as small as possible and the flow speed as high as possible.

In another preferred embodiment, the fluid intake edge for the nozzle duct has a sharp edge design. As a result of this sharp edge, a liquid jet separation occurs at the intake edge with an air bolster between the liquid jet and the nozzle duct wall. Air has a smaller refraction index than the generally used nozzle materials such as quartz or sapphire. Also, the refraction index of air is smaller than that of the liquid to be used, meaning a liquid jet forms that functions as nearly ideal radiation guide. The laser radiation guided inside the liquid jet is thus "insulated" against the nozzle wall.

The air bolster proves itself in particular if the refraction index of the liquid jet guiding the radiation is smaller than the one for the nozzle because an outflowing of the radiation could then take place. If the refraction index for the liquid is bigger than the one for the nozzle material, then a total reflection occurs at the interface between the two mediums (liquid/nozzle wall), but the radiation enters the other material until it reaches the so-called penetration depth ("frustrated total internal reflection", "Goos-Hänchen-Shift"). If the nozzle material has an absorption coefficient that can no longer be neglected with the radiation used, then the air bolster here prevents a penetration of the radiation as well and thus also a damaging of the nozzle walls.

Thanks to the design of the air bolster, even materials that absorb the laser radiation can be used for the nozzle because the bolster keeps these away from the nozzle walls. Furthermore, an adjustment of the focusing cone to the nozzle duct axis is no longer absolutely necessary as a result of this because the radiation can no longer reach the nozzle duct walls due to the air bolster, even with a slight maladjustment. The angle for the focusing cone now can be selected such that it corresponds to the theoretical value for the numerical aperture of the liquid jet.

If, for example, the liquid is selected to be an oil from the group of silicone oils, e.g. a polydimethylsiloxane or a polymethylphenylsiloxane and quartz as nozzle material, then the refraction index of the liquid is higher than that of the nozzle material. The nozzle duct then has the quality of a beam guide, even if there is no air bolster. In that case, the length and shape of the nozzle duct is not critical for the beam guidance. It would even be possible to realize very long and bent nozzle ducts.

Of course it is possible to use other electrically conducting as well as in particular electrically non-conducting liquids in place of silicone oil. They must be selected such that their absorption for the laser wave length used remains within an acceptable frame in view of the flow speeds than can be achieved in the feed lines in the area of the nozzle in order to avoid a thermal lens. We want to point here especially to those types of liquids, which are used for liquid fibers as usable liquids.

The suggested arrangement permits liquid jet lengths of more than 200 mm. If an uninterrupted flow is ensured at the intake of the nozzle duct, the liquid pressure can be increased and the compact liquid jet length increased to a maximum, which depends above all on the liquid used and the nozzle diameter. Thus, for example, it follows that for water and a nozzle duct diameter of 150 $\mu$m, a maximum compact jet length of 150 mm for 80 bar liquid pressure results. If a silicone oil is used in place of water, then the compact liquid jet length can be increased to up to 500 mm. The length prior to the start of the "disintegration into drops" is referred to as compact liquid jet length. This disintegration into drops is based on unavoidable swirling, caused by the surrounding air as well as the surface tension.

The disintegration length of the liquid jet can be varied by way of the pressure of the liquid before it enters the nozzle duct. However, causing a purposeful interference to the liquid immediately prior to the nozzle duct intake is more elegant. This can be done, for example, with a piezo element, which exerts pressure jolts of a predetermined frequency and amplitude onto the liquid. The length of the liquid jet then depends on these parameters. The adjustment of the liquid jet length is important particularly if the layers below the material to be processed must not be hit by the laser beam.

Furthermore, the absorption of the above-named oil over a wide wave-length range of the radiation is lower than that of water, so that on the one hand the work length is no longer limited by the absorption in the liquid, and on the other hand, the effect of the thermal lens in front of the nozzle is avoided or strongly reduced. At the same time, this also provides a protective effect against corrosion during and after the processing of the work piece.

Silicone oils have a series of advantageous qualities for this type of material processing. Namely they have an excellent resistance to oxidation, hydrolysis and weathering. Also, they exhibit a chemical indifference that excludes a corrosion danger. Furthermore, they distinguish themselves by an extremely low combustibility as well as a high compressibility.

As a result of the long length of a liquid jet with nearly constant, high radiation intensity, a working length that is increased several times is obtained. This makes it possible, among other things, to process multilayer objects, e.g. objects consisting of two glass sheets with an air gap . . . , because the liquid jet conducting the high-energy laser radiation, which emerges from a cut joint or a hole for the most part retains its quality as beam guide.

An optimum coupling of the laser radiation is achieved if the focal point is placed in the plane for the nozzle opening. The underside for the laser radiation transmitting window, which faces the nozzle opening, should be at a distance of 200 $\mu$m to 500 $\mu$m for a nozzle diameter of 100 $\mu$m. This avoids a liquid retaining chamber that would favor the formation of a thermal lens.

In addition, the laser beam conducted in the liquid jet, permits parallel cut edges. This makes it possible to process larger material strengths, among other things with a lower material loss.

By coupling the laser beam with the liquid jet, the beam quality of the laser, which among other things is made worse by the beam guidance in a beam guide, plays a subordinate role. This lowers the purchasing costs for the laser. A beam guide for guiding the beam from the laser source to a coupling place within the working module also solves all safety problems for the beam guidance by the user. For the conventional beam focusing with only one focusing system without liquid jet, the poorer beam quality would lead to an even shorter working length.

The use of a beam guide, starting with the laser source, the small geometric dimensions of the coupling arrangement and the precise control that is no longer needed for a working distance between focusing unit and the surface of the work piece to be processed result in a simple displacement or sliding arrangement for the processing module.

The danger arising with the conventional beam focusing of having dirt on the focusing lens or a glass that protects this lens, caused by the spraying of material that is stripped from the work piece, are nonexistent here. Furthermore, the liquidity of the liquid jet ensures a very efficient cooling of the processing zone, so that no thermal stressing of the work piece along its processing edges can occur. For example, it is no longer possible for the material to pull out of shape when cutting small webs. In addition, this cooling leads only to a very slight hardening of the processing zone, which makes a reworking, e.g. an additional thread cutting, very simple.

A gas and dust development is avoided at the same time because the liquid bonds the stripped material. This eliminates the need for expensive exhaust air filtering systems.

Furthermore, melting occurrences are avoided or greatly reduced by the impacting liquid. The processing quality is very high. Also, it is possible to achieve protection against corrosion for corroding materials through a suitable selection of the liquid.

In a comparison with the known water jet cutting of work pieces, for which a water jet with mixed-in abrasive materials is used under considerably higher pressure relative to the above method according to the invention, a simple hydraulic system with flexible hydraulic lines can be used with the low pressure necessary for this method. This results in a simple slider system for the processing module. Furthermore, the strong wear of the nozzles, as it occurs with the water jet cutting, does not exist. Also, the slowing down of the liquid jet does not present any problems with the method according to the invention.

Water is the only liquid known from prior art for the liquid jet. Liquids other than water could be used only after liquid forming the liquid jet was captured, reprocessed and reused in particular in a closed circulation, for economic reasons.

After designing the liquid feed line or feed lines without liquid retaining chambers in the focusing channel tip area coordinated with the nozzle duct, it was determined that insofar as the nozzle material and also the liquid consist of electrically insulating material, an electrical charging of the liquid for the jet takes place. The charging results in voltages of more than 5 kV. If this electrically charged liquid jet is directed toward the material to be cut, it discharges its charge to this material. If, for example, copper or aluminum is processed with the radiation of an Nd:YAG laser coupled with a liquid jet, it can be determined that the material stripping rate strongly depends on the charge of the jet.

For a pulsed Nd:YAG laser radiation with 250 mJ, a pulse width of 0.1 ms and a liquid pressure of 10 bar, there is only a very slight material ablation. If the liquid pressure is increased to 100 bar, then an excellent stripping rate is achieved. This liquid jet with coupled-in laser radiation then produces a plasma on the material to be processed at a much faster rate because of its electrical charge, which increases the stripping rate. This effect can be increased even further by increasing the pressure to, for example, 1000 bar or by a directed electrical charging of the liquid in front of the nozzle intake.

Furthermore, the electrical charge of the liquid jet can be used in that its deflection is caused by a neighboring electrical field.

In the following, examples of the device according to the invention are explained in more detail with the aid of drawings. Advantages of the invention follow from the subsequent descriptive text.

DETAILED DESCRIPTION OF THE INVENTION

Figure 1:
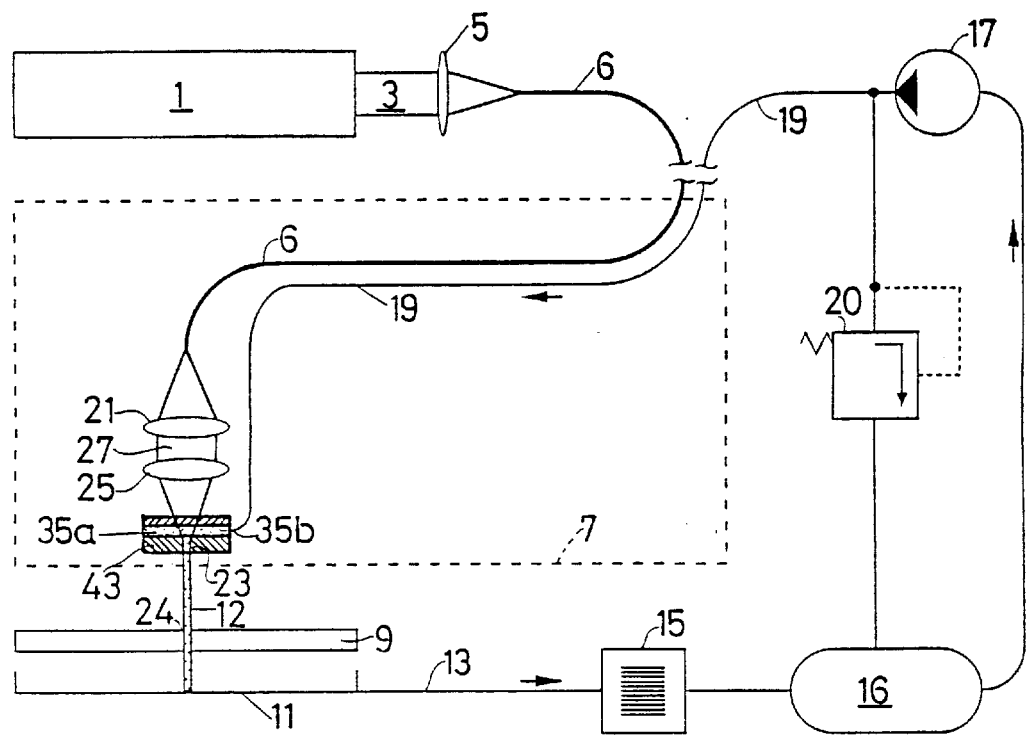
FIG. 1 is a block diagram of a material processing device.

The material processing arrangement shown in FIG. 1 has an ND:YAG laser 1 as radiation source, which emits a laser beam 3 with a wave length of 1.064 μm. The laser 1 has capacity of 100 W in this case. With the aid of a focusing unit 5, this laser beam 3 is coupled with a beam guide 6 with a standard core diameter of 100 μm to 600 μm, in this case 200 μm. The core diameter for the beam guide 6 is selected in accordance with the radiation capacity that must be guided. For a 500 W laser, for example, it would be around 400 μm and for a 1 kW laser around 600 μm. The radiation guide 6 is connected to a processing module 7 for the material processing, here also called a nozzle, that can be adjusted horizontally and in height. Owing to the fact that the radiation is conducted via the radiation guide 6, the laser 1 does not have to be arranged directly in the area of the work piece 9 to be processed or the processing module 7.

The work piece 9 for processing, to be cut in this case, is arranged below the processing module 7. A catch basin 11 for catching the liquid from a liquid jet 12 which flows through a cut, for example produced here, is arranged below the work piece 9. The liquid to be caught in the catch basin 11 is cleaned in a filter 15 that is connected via a line 13 with the catch basin 11 and is then fed into a reservoir 16, from which it can be recirculated to the processing module 7 by a pump 17 and via a line 19. At the pump discharge, the line 19 is connected for safety reasons and for the pressure adjustment in the line 19 via an excess pressure valve 20 with reservoir 16.

Figure 3:
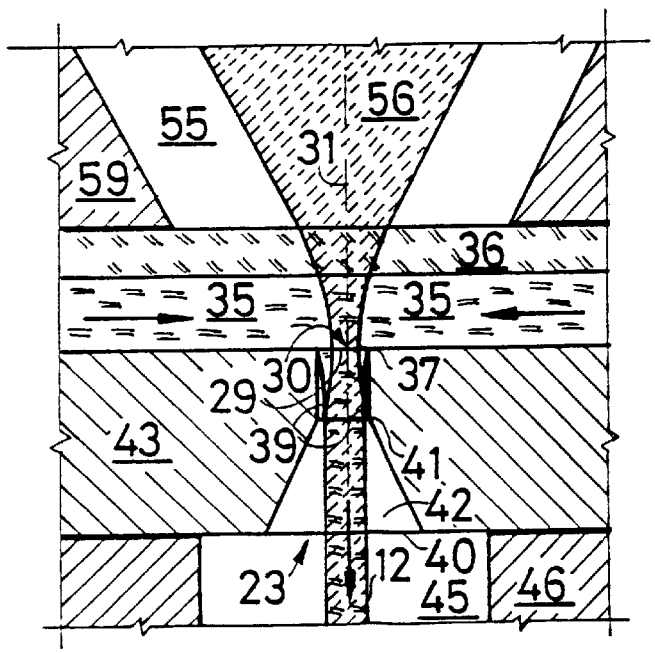
FIG. 3 longitudinal cut that is enlarged relative to FIG. 2, through the nozzle block of the nozzle as well as the liquid line that feeds the liquid without a retaining chamber.

The processing module 7 has a collimator 21 for collimating the laser beam that is advanced with the radiation guide 6, a nozzle block 43 with a nozzle duct 23 for forming the liquid jet 12 that is directed against the processing location 24 on the work piece 9, as well as a focusing lens 25 for focusing the collimated laser beam 27 into the plane 29 for the intake opening 30 at the location of the nozzle axis 31 for the nozzle duct 23 of the nozzle block 43, as shown in an enlarged view in FIG. 3. A disk-shaped liquid supply line 35 exists above the nozzle intake opening 30 as liquid supply line. The liquid supply line 35 does not have a liquid chamber functioning as retaining chamber in the area surrounding the nozzle intake opening 30. The height for liquid supply line 35 should theoretically only have half the cross section of the nozzle duct 23. However, in order to reduce the frictional losses of the liquid in the pipe as well as to avoid swirling, this cross section was selected somewhat larger. A window 36 that is preferably coated with an antireflex material is inserted into the wall of the liquid supply line 35, above the nozzle intake opening 30, through which the laser radiation can be focused with the focusing lens 25 into the plane 29 of the intake opening 30 for the nozzle duct 23.

The edge 37 of the nozzle intake opening 30 is designed such that it has sharp edges with a radius of less than 50 $\mu$m, preferably smaller than 5 $\mu$m. Owing to this sharp edge 37, the liquid jet separates from the upper nozzle edge 37, which has an air bolster 39 below it. Since air has a smaller refraction index than the normally used nozzle materials such as quartz or sapphire and the refraction index of air is also smaller than that of the silicone oil used as preferred liquid, the liquid jet 12 forms as a nearly ideal radiation guide. We want to point to the explanations in the introduction to the description with respect to the effects of the different refraction indices of nozzle material and liquid. The nozzle discharge opening 40 is expanded relative to the intake opening 30, starting in the upper nozzle duct third 41 already. This expansion 42 avoids a swirling of the air bolster 39 that is located in the nozzle duct 23.

Figure 2:
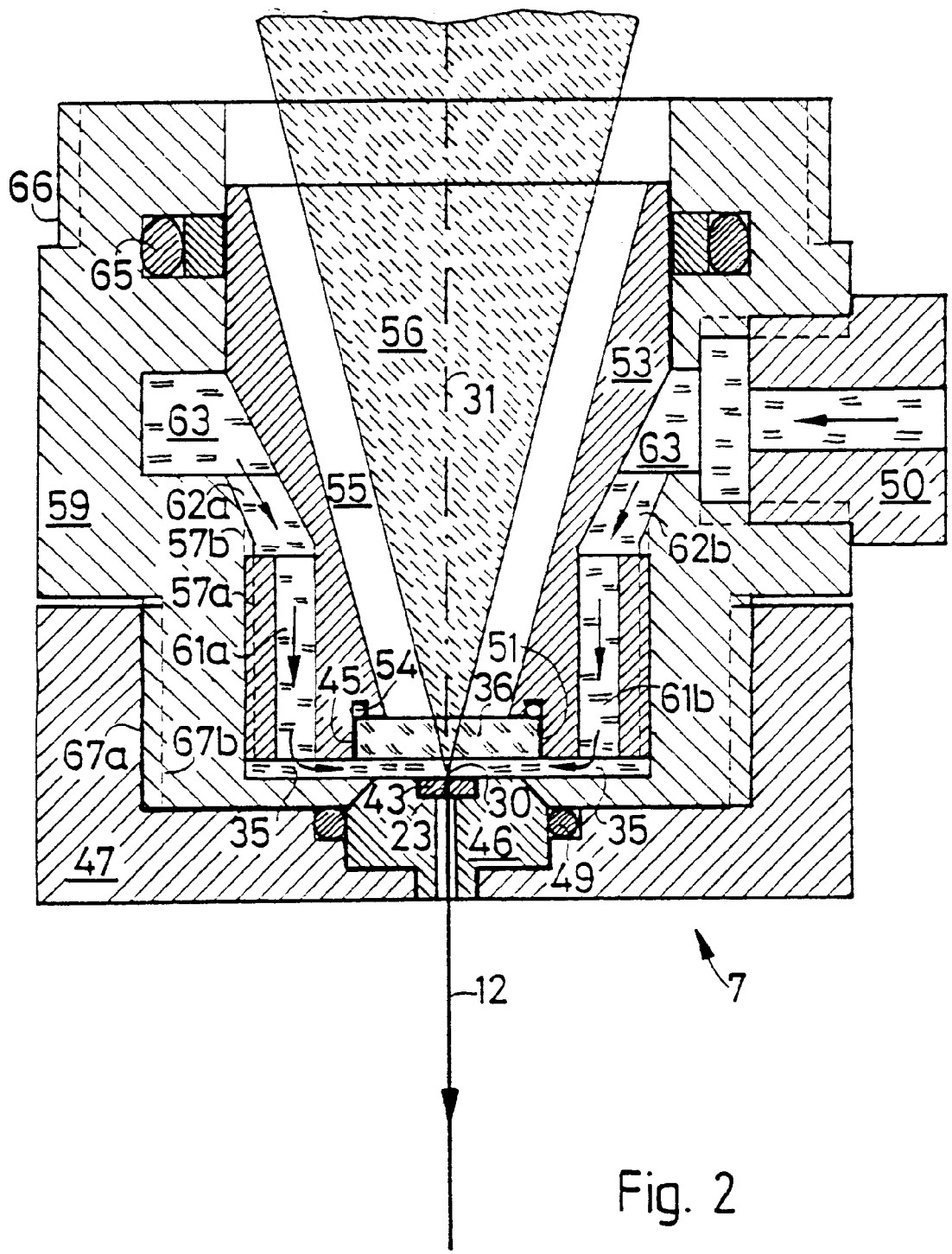
FIG. 2 longitudinal cut through the lower part of the processing module for the material processing arrangement, which has a nozzle for the liquid jet, wherein in this case the cross section of the liquid feed 35 relative to the nozzle block 43 is enlarged considerably for illustration purposes.

The nozzle duct 23 of the "nozzle block 43" that forms the liquid jet 12 is, as shown in FIG. 2, held in a nozzle block holder 46 with central borehole 45 for the liquid jet 12, which block is held in a bottom element 47 of the processing module 7. The seal on the side is with a sealing ring (O-ring) 49. The line 19 supplying the liquid can be flanged to a flange 50.

The window 36 is arranged in a center recess 51 of an insert 53. The sealing of the window 36 against the insert 53 is also with a sealing ring 54. It can also be glued in. The insert 53 has a conical inside area 55, the conical shape of which is adapted to the focusing cone 56 of the laser radiation that is to be focused with the focusing lens 25. The insert 53 furthermore has an outside thread 57a, with which it is screwed into an inside thread 57b of a lower base element 59 of the processing module 7. The insert 53 has several coaxially distributed, axial liquid ducts 61a and 61b, the width of which is selected such that the liquid can be transferred safely to the liquid supply line 35. The height of liquid supply line 35 is adjusted through the screw-in depth of the insert 53. The liquid ducts 61a and 61b could also be formed as slits originating from the outside thread 57a, contrary to the illustration in FIG. 2. The liquid ducts 61a and 61b are discharged via one each transitional duct 62a or 62b into a ring-shaped duct 63 that runs coaxially to the nozzle axis 31 inside the lower part of base element 59 and which is connected to flange 50. The insert 53 is scaled off toward the top with another seal 65. The lower part 59 of the base element can be screwed into the base element of the processing module 7, which is not shown in detail, via the outside thread 66.

The bottom element 47 has an inside thread 67a, with which it can be screwed onto the outside thread 67b of the lower part 59 of the base element. Since the nozzle block holder 46 with the nozzle block 43 is only inserted into the bottom element 47, the nozzle block 43 can be exchanged quickly if, for example, a liquid jet 12 with another jet cross section must be used or it must be replaced.

In place of water and silicone oil, other liquids as well as (real or colloidal) solutions of materials can be used in accordance with the above-mentioned conditions.

In place of designing the liquid supply line 35 as a disk, it can also be produced as a conical shape with a sharp half-angle, wherein the angle point (cone point) comes to rest over the nozzle intake opening. The window 36 in that case is no longer a plane parallel disk, but has a pyramid point at the side facing the nozzle intake and a spherical contour on the opposite side, in order to balance out the scattering effect of the pyramid point. This design results in a better flow against the nozzle intake.

When cutting sandwich structures, the work piece 9 or the processing module 7 preferably are moved only in steps. Each of the individual structural elements can then be cut one after the other with successive pulses.

I claim:

1. Method for processing material using a laser that emits a laser beam guided by a liquid jet comprised of liquid with a predetermined radiation absorption coefficient, with radiation from the laser beam being focussed in a focusing cone point range, the laser beam being directed at a nozzle having a nozzle duct provided with a nozzle intake opening disposed in a plane, the method comprising locating a radiation focusing point for coupling the laser beam into the liquid jet at the plane of the intake opening of the nozzle duct; conducting the liquid jet in an area surrounding the nozzle intake opening in the absence of a retaining chamber such that a flow speed for said liquid with said predetermined radiation absorption coefficient in the focusing cone point range of the radiation is sufficiently high that a formation of a thermal lens in the focusing point range is suppressed.

2. Method according to claim 1, including surrounding the liquid jet formed at the nozzle intake opening with an air bolster to thereby insulate the walls of the nozzle.

3. Method according to claim 1, including using silicone oil as the liquid jet, the silicon oil being from the group of polymethylsiloxane, and including using laser radiation with a wave length between 0.25 $\mu$m and 2.1 $\mu$m.

4. Method according to claim 1, including recovering liquid during material processing of the work piece, filtering the recovered liquid and returning the filtered liquid to the nozzle.

5. Method according to claim 1, wherein a laser beam emitted from the laser is guided by a laser beam guide located completely external of the liquid surrounding the nozzle intake opening.

6. Arrangement for processing material with a liquid jet comprising a laser for emitting a laser beam, and a processing module that includes a nozzle having a nozzle duct connected to a liquid supply line for forming a liquid jet comprised of liquid with a predetermined radiation absorption coefficient, the nozzle duct having an intake opening possessing a cross-sectional area and lying in an intake opening plane, an optical element for coupling the laser beam into the liquid jet, the optical element of the laser beam being focused in a focusing point range and into the intake opening plane of the nozzle duct, and the liquid supply line for the nozzle duct defining an area formed above the nozzle intake opening, the area above the nozzle intake opening having a height dimensioned relative to the cross-sectional area of the nozzle intake opening such that the area above the nozzle intake opening is absent a liquid retaining chamber, and a flow speed for said liquid with said predetermined radiation absorption coefficient in a focusing cone point range is sufficiently high that a formation of a thermal lens in the liquid in the focusing cone point range is suppressed.

7. Arrangement according to claim 6, wherein a wall of the liquid feed line is defined by a cover that is transparent to the laser radiation.

8. Arrangement according to claim 6, wherein the nozzle duct and the intake opening have surfaces that make contact with the liquid, said surfaces as well as the liquid being electrically insulating and the flow speed of the liquid in the area of the intake opening and the nozzle duct being selected high enough so that an electrical charge of the liquid jet takes place increase a material stripping rate.

9. Arrangement according to claim 6, wherein the nozzle duct includes a liquid intake edge, the liquid intake edge of the nozzle duct having a radius smaller than 50 $\mu$m.

10. Arrangement according to claim 6, wherein the nozzle includes a nozzle discharge opening that is expanded relative to the intake opening.

11. Arrangement according to claim 6, wherein the laser is spatially removed from the processing module, the arrangement further including a radiation guide for feeding laser radiation from the laser to the optical element.

12. Arrangement according to claim 6, wherein the liquid is a silicone oil from the group of polymethylsiloxane and laser radiation from the laser being in a wave length range between 0.25 $\mu$m and 2.1 $\mu$m.

13. Arrangement according to claim 6, including a catch basin for catching the liquid that flows through a work piece opening during material processing of the work piece or for catching the liquid that runs off the work piece, and a pump connected to a filtering unit for filtering the liquid from the catch basin and for pumping the liquid back to the nozzle duct.

14. Arrangement according to claim 6, including a coupling element for installing the processing module on a spatially movable adjustment unit.

15. Arrangement according to claim 6, further comprising a laser beam guide for the laser beam emitted from the laser, wherein no portion of the laser beam guide is located in the liquid supply line.

16. An arrangement for processing material with a liquid jet, comprising:
   a laser for emitting a laser beam;
   a processing module that includes a nozzle having a nozzle duct connected to a liquid supply line for forming a liquid jet of a liquid, the nozzle duct having an intake opening lying in an intake opening plane;
   an optical element for coupling the laser beam into the liquid jet, the optical element being focused into the intake opening plane of the nozzle duct; and
   means for sufficiently suppressing the formation of a thermal lens in the liquid such that no portion of radiation of the laser damages walls of the nozzle duct.

17. Arrangement according to claim 16, further comprising a laser beam guide for the laser beam emitted from the laser, wherein no portion of the laser beam guide is located in the liquid supply line.

* * * * *